(12) United States Patent
Dire et al.

(10) Patent No.: US 10,233,312 B2
(45) Date of Patent: Mar. 19, 2019

(54) MODIFIED DIENE ELASTOMER, SYNTHESIS METHOD FOR SAME, AND RUBBER COMPOSITION COMPRISING MODIFIED DIENE ELASTOMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Charlotte Dire, Clermont-Ferand (FR); Jean-Marc Marechal, Clermont-Ferrand (FR); Margarita Dorato, Clermont-Ferrand (FR); Mathieu Manceau, Clermont-Ferrand (FR); Nuno Pacheco, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 244 days.

(21) Appl. No.: 14/910,177

(22) PCT Filed: Jul. 31, 2014

(86) PCT No.: PCT/EP2014/066553
§ 371 (c)(1),
(2) Date: Feb. 4, 2016

(87) PCT Pub. No.: WO2015/018743
PCT Pub. Date: Feb. 12, 2015

(65) Prior Publication Data
US 2016/0160015 A1    Jun. 9, 2016

(30) Foreign Application Priority Data

Aug. 8, 2013 (FR) ...................................... 13 57887

(51) Int. Cl.
| | | |
|---|---|---|
| *C08L 9/06* | (2006.01) | |
| *C08C 19/25* | (2006.01) | |
| *C08C 19/44* | (2006.01) | |
| *C08L 15/00* | (2006.01) | |

(52) U.S. Cl.
CPC ............... *C08L 9/06* (2013.01); *C08C 19/25* (2013.01); *C08C 19/44* (2013.01); *C08L 15/00* (2013.01); *C08L 2205/02* (2013.01)

(58) Field of Classification Search
CPC ....................................................... C08C 19/25
See application file for complete search history.

(56) References Cited

U.S. PATENT DOCUMENTS

| 8,344,063 | B2 * | 1/2013 | Marechal | B60C 1/0016 524/571 |
|---|---|---|---|---|
| 2008/0319151 | A1 | 12/2008 | Oshima | |
| 2009/0036567 | A1 | 2/2009 | Oshima et al. | |
| 2010/0184912 | A1 * | 7/2010 | Marechal | B60C 1/0016 524/571 |
| 2011/0178233 | A1 | 7/2011 | Chaboche et al. | |
| 2012/0252928 | A1 | 10/2012 | Marechal et al. | |

FOREIGN PATENT DOCUMENTS

| FR | 2930554 A1 | 10/2009 |
|---|---|---|
| FR | 2951178 A1 | 4/2011 |
| JP | 2005290355 A | 10/2005 |
| JP | 2009030027 A | 2/2009 |
| JP | 2010525087 A | 7/2010 |
| JP | 2011102347 A | 5/2011 |
| JP | 2011518934 A | 6/2011 |
| JP | 2012201863 A | 10/2012 |
| JP | 2013082841 A | 5/2013 |
| WO | 2009077837 A1 | 6/2009 |

OTHER PUBLICATIONS

International Search Report for Application PCT/EP2014/066553 dated Nov. 25, 2014.

* cited by examiner

*Primary Examiner* — Vickey Nerangis
(74) *Attorney, Agent, or Firm* — Dickinson Wright PLLC (57) ABSTRACT

A modified diene elastomer comprises:
at least 55% by weight of entity coupled by a functional group bearing a function of formula —SiOR, in which R is a hydrogen atom or an alkyl radical, and optionally bearing another function capable of interacting with a reinforcing filler,
from 5% by weight to 30% by weight of star-branched entity having three elastomeric branches connected to one and the same silicon atom belonging to a functional group bearing or not bearing a function capable of interacting with a reinforcing filler,
less than or equal to 15% by weight of entity functionalized at the chain end by a functional group bearing a function —Si(OR)$_2$, in which R is a hydrogen atom or an alkyl radical, and optionally bearing another function capable of interacting with a reinforcing filler, and
a content of less than or equal to 15% by weight of non-functional diene elastomer.

18 Claims, 2 Drawing Sheets

MODIFIED DIENE ELASTOMER, SYNTHESIS METHOD FOR SAME, AND RUBBER COMPOSITION COMPRISING MODIFIED DIENE ELASTOMER

This application is a 371 national phase entry of PCT/EP2014/066553, filed 31 Jul. 2014, which claims benefit of French Patent Application No. 1357887, filed 8 Aug. 2013, the entire contents of which are incorporated herein by reference for all purposes.

BACKGROUND

1. Field

The present invention relates to a diene elastomer modified by an alkoxysilane group, optionally partially or completely hydrolysed, bearing, if appropriate, another function capable of interacting with a reinforcing filler within a rubber composition. The present invention also relates to a reinforced rubber composition, which can be used in particular in the manufacture of tires, comprising this elastomer.

2. Description of Related Art

Now that savings in fuel and the need to protect the environment have become a priority, it is desirable to produce polymers having good mechanical properties and a hysteresis which is as low as possible in order to be able to process them in the form of rubber compositions which can be used in the manufacture of various semi-finished products participating in the forming of tires. Many solutions have already been experimented with in order to achieve the objective of fall in hysteresis. Mention may in particular be made of the modification of the structure of diene polymers and copolymers for the purpose of polymerization by means of functionalization agents, with the aim of obtaining a good interaction between the polymer, thus modified, and the filler, whether carbon black or a reinforcing inorganic filler. Provision has in particular been made to use diene polymers functionalized by alkoxysilane derivatives.

Mention may be made, by way of illustration of this prior art relating to reinforcing inorganic fillers, for example, of U.S. Pat. No. 5,066,721, which describes a rubber composition comprising a diene polymer functionalized by an alkoxysilane having at least one non-hydrolysable alkoxyl residue as a mixture with silica. Mention may also be made of Patent Application EP A 0 299 074, which describes functionalized polymers comprising alkoxysilane functions at the chain end. These functionalized polymers have been described in the prior art as effective in reducing hysteresis and improving abrasion resistance; however, their properties remain insufficient to allow the processing of these polymers in compositions intended to constitute treads of tires.

Provision has also been made to combine the functionalization by alkoxysilane functions with functionalization by other functions, in particular the amine function. Thus, Patent EP 0 992 537 describes a rubber composition which comprises an extended elastomer modified at the chain end by an alkoxysilane function and bearing, at the other end or along its chain, one or more amine functions. Furthermore, provision has also been made to improve the properties of rubber compositions by using elastomers functionalized at the chain end by alkoxysilane functions bearing an amine group, whether this is as black, silica or hybrid mixture. Mention may be made, for example, of Patent Application US 2005/0203251, which describes a rubber composition reinforced by silica comprising an elastomer functionalized at the chain end by an alkoxysilane bearing an amine group. Nevertheless, it turns out that the compositions comprising elastomers thus modified, whether black, silica or hybrid mixture, do not always exhibit a processing which is acceptable and a hysteresis which is satisfactory for use as tire tread.

The Applicant Companies have described, in the document WO 2009133068 A1, a functionalized diene elastomer essentially composed of the coupled entity of an elastomer having, within the chain, a group bearing an alkoxysilane function and an amine function, the silicon atom of this group bonding the two parts of the chain of the diene elastomer. This functionalized elastomer confers improved mechanical and dynamic properties on the composition in which it is present, in particular an improved hysteresis, while retaining a satisfactory raw processing, for the purpose in particular of use as tire tread.

It is an ongoing concern of designers of materials intended for the manufacture of tires to improve the compromise in mechanical and dynamic properties of the rubber compositions for the purpose of improving the performance of the tire in which they are present, without, however, damaging the stages of its manufacture or the properties of the elastomer. Thus, for example, the improvement in the compromise in properties must not be made to the detriment of the cold flow of the elastomer, which causes major disadvantages during the transportation and storage of rubbers.

Provision has already been made in the past to add elastomers coupled or star-branched using additional coupling or star-branching agents comprising tin or silicon in order to moderate the cold flow. Thus, for example, Patent Application WO 2009/077837 describes elastomers functionalized at each chain end in combination with elastomers which are star-branched, particularly by silicon. However, the combinations illustrated result in a reinforced rubber composition, the compromise in processing/hysteresis properties of which is not satisfactory for a tire application. The Applicant Companies have described, in Patent Application WO 2011/042507, a functionalized diene elastomer composed of a diene elastomer functionalized at one chain end by a silanol function and, in a certain proportion, of a coupled or star-branched diene elastomer based on tin. This elastomer confers, on a rubber composition in which it is present, hysteresis and processing properties which are entirely satisfactory and acceptable for tire use, while exhibiting a significantly improved resistance to cold flow.

SUMMARY

The technical problem which the invention intends to solve is that of further improving the compromise in hysteresis and processing properties of a rubber composition for the purpose of a tire application, without damaging its manufacture or the properties of the elastomer present in this composition, in particular its resistance to cold flow.

The inventors have now demonstrated that a predominantly coupled diene elastomer of specific composition comprising in particular certain proportions of star-branched entity and obtained by reaction with a trialkoxysilane compound bearing or not bearing another function capable of interacting with a reinforcing filler confers, on the rubber compositions in which it is present, a noteworthy and unexpected improvement in the raw processing/hysteresis compromise, while retaining a satisfactory cold flow of the elastomer.

A subject-matter of the invention is thus a modified diene elastomer based:

a) on at least 55% by weight, with respect to the total weight of the modified diene elastomer, of entity coupled by a functional group bearing a function of formula —SiOR, in which R is a hydrogen atom or an alkyl radical having from 1 to 10 carbon atoms, and optionally bearing another function capable of interacting with a reinforcing filler, the group being bonded to the two branches of the diene elastomer via the silicon atom,
b) on from 5% by weight to 30% by weight, with respect to the total weight of the modified diene elastomer, of star-branched entity having three elastomeric branches connected to one and the same silicon atom belonging to a functional group bearing or not bearing another function capable of interacting with a reinforcing filler,
c) on a content of less than or equal to 15% by weight, with respect to the total weight of the modified diene elastomer, of entity functionalized at the chain end by a functional group bearing a function of formula —Si(OR)$_2$, in which R is a hydrogen atom or an alkyl radical having from 1 to 10 carbon atoms, and optionally bearing another function capable of interacting with a reinforcing filler, the group being bonded to the diene elastomer via the silicon atom, and
d) on a content of less than or equal to 15% by weight, with respect to the total weight of the modified diene elastomer, of non-functional diene elastomer,
the diene elastomers a), b), c) and d) being, before modification, of the same macrostructure and the same microstructure.

Another subject-matter of the invention is a process for the synthesis of said modified diene elastomer.

Another subject-matter of the invention is a reinforced rubber composition based on at least one reinforcing filler and on an elastomer matrix comprising at least said modified diene elastomer.

DETAILED DESCRIPTION OF THE SPECIFIC EMBODIMENTS

In the present description, unless expressly indicated otherwise, all the percentages (%) shown are % by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

It should be specified that it is known to a person skilled in the art that, when an elastomer is modified by reaction of a functionalization agent with the living elastomer resulting from an anionic polymerization stage, a mixture of modified entities of this elastomer is obtained, the composition of which depends in particular on the proportion of reactive sites of the functionalization agent with respect to the number of living chains. This mixture comprises entities functionalized at the chain end, coupled, star-branched and/or non-functionalized.

In the present description, the term "modified diene elastomer" is understood to mean a diene elastomer which comprises a functional group comprising at least one silicon atom and optionally a function capable of interacting with a reinforcing filler, and which results from the modification by means of a functionalization agent of trialkoxysilane type bearing or not bearing another function capable of interacting with a reinforcing filler. This is generally an elastomer obtained by reaction of a living diene elastomer resulting from the anionic polymerization stage with the functionalization agent in question.

When the group is located at the chain end, it will then be said that the diene elastomer is functionalized at the chain end.

When the group is located in the main linear elastomer chain, it will then be said that the diene elastomer is coupled or alternatively functionalized in the middle of the chain, in contrast to the position "at the chain end", although the group is not located precisely at the middle of the elastomer chain. The silicon atom of this group bonds the two branches of the chain of the diene elastomer.

When the group is central, to which three elastomer chains or branches are bonded, forming a star-branched structure of the elastomer, it will then be said that the diene elastomer is star-branched. The silicon atom of this group bonds the three branches of the modified diene elastomer to one another.

Thus, a subject-matter of an embodiment of the invention is a modified diene elastomer composed of the entities a), b), c) and d) in the proportions indicated above.

As regards the star-branched entity b), the modified diene elastomer preferably comprises at least 10% by weight, with respect to the total weight of the modified diene elastomer, of said star-branched entity b). Preferably again, the modified diene elastomer comprises at most 25% by weight, more preferably at most 20% by weight, with respect to the total weight of the modified diene elastomer, of the star-branched entity b).

As regards the non-functional entity d), the modified diene elastomer preferably comprises a content strictly of greater than 0% by weight and less than 10% by weight, with respect to the total weight of the modified diene elastomer, of the non-functional entity d).

As regards the coupled entity a), the modified diene elastomer preferably comprises a content of greater than or equal to 65% by weight, indeed even of greater than or equal to 70% by weight, with respect to the total weight of the modified diene elastomer, of the coupled entity a).

As regards the entity functionalized at the chain end c), the modified diene elastomer preferably comprises a content of less than or equal to 10% by weight, with respect to the total weight of the modified diene elastomer, of the entity functionalized at the chain end c).

The preferred aspects relating to the entities a), b), c) and d) can be combined with one another.

The term "diene elastomer" is understood to mean, according to the invention, any homopolymer obtained by polymerization of a conjugated diene monomer having from 4 to 12 carbon atoms or any block, random, sequential or microsequential copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene, 2,4-hexadiene and the like. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene, vinylnaphthalene, and the like.

Preferably, the diene elastomer is chosen from polybutadienes, butadiene/styrene copolymers, butadiene/styrene/isoprene copolymers, styrene/isoprene copolymers, butadiene/isoprene copolymers and synthetic polyisoprene. Advantageously, the diene elastomer is a butadiene/styrene copolymer.

According to alternative forms of the invention, the modified diene elastomer does not comprise another function than that comprising the silicon atom directly bonded to the elastomer chain.

According to other alternative forms of the invention, the modified diene elastomer also comprises another function capable of interacting with a reinforcing filler, this function being carried by the group comprising the silicon atom. These alternative forms are understood as not excluding the fact that the function comprising the silicon atom directly bonded to the elastomer chain interacts favourably with the reinforcing filler.

The term "group" or "function capable of interacting with a reinforcing filler" is understood to mean any group or function capable of forming, within a rubber composition reinforced by means of a filler, a physical or chemical bond with said filler. This interaction can be established, for example, via covalent, hydrogen, ionic and/or electrostatic bonds between said function and functions present on fillers.

The term "function capable of interacting with a reinforcing filler" is preferably understood to mean functions comprising at least one heteroatom chosen from N, S, O or P. Mention may be made, by way of example, among these functions, of primary, secondary or tertiary and cyclic or non-cyclic amines, isocyanates, imines, cyanos, thiols, carboxylates, epoxides or primary, secondary or tertiary phosphines.

Mention may thus be made, as secondary or tertiary amine function, of amines substituted by $C_1$-$C_{10}$, preferably $C_1$-$C_4$, alkyl radicals, more preferably a methyl or ethyl radical, or else cyclic amines forming a heterocycle comprising a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable.

Mention may be made, as imine function, of the ketimines. For example, the (1,3-dimethylbutylidene)amino-, (ethylidene)amino-, (1-methylpropylidene)amino-, (4-N,N-dimethylaminobenzylidene)amino-, (cyclohexylidene)amino-, dihydroimidazole et imidazole groups are suitable.

Mention may thus be made, as carboxylate function, of acrylates or methacrylates. Such a function is preferably a methacrylate.

Mention may be made, as epoxide function, of the epoxy or glycidyloxy groups.

Mention may be made, as secondary or tertiary phosphine function, of phosphines substituted by $C_1$-$C_{10}$, preferably $C_1$-$C_4$, alkyl radicals, more preferably a methyl or ethyl radical, or else diphenylphosphine. For example, the methylphosphino-, dimethylphosphino-, ethylphosphino-, diethylphosphino, ethylmethylphosphino- and diphenylphosphino-groups are suitable.

According to alternative forms of the invention, the other function capable of interacting with a reinforcing filler is directly bonded to the silicon atom itself directly bonded to the diene elastomer.

According to other alternative forms of the invention, the other function capable of interacting with a reinforcing filler and the silicon atom directly bonded to the diene elastomer are bonded via a spacer group which can be an atom or a group of atoms. This spacer group can be a saturated or unsaturated, cyclic or non-cyclic, linear or branched, divalent $C_1$-$C_{18}$ aliphatic hydrocarbon radical or a divalent $C_6$-$C_{18}$ aromatic hydrocarbon radical and can comprise one or more aromatic radicals and/or one or more heteroatoms. The hydrocarbon radical can optionally be substituted.

According to preferred alternative forms of the invention, the spacer group is a linear or branched, divalent $C_1$-$C_{10}$ aliphatic hydrocarbon radical, more preferably a linear divalent $C_1$-$C_6$ aliphatic hydrocarbon radical and more preferably still the linear divalent $C_3$ hydrocarbon radical.

The different aspects, preferred or nonpreferred, which precede and which relate in particular to the nature of the other function capable of interacting with a reinforcing filler, the nature of the spacer group, the nature of the diene elastomer, the nature of the function comprising the silicon atom and the proportions of the different entities can be combined with one another.

According to advantageous alternative forms of the invention, at least one of the four following characteristics is observed and preferably the four:
  the other function capable of interacting with a reinforcing filler is a tertiary amine, more particularly a diethylamino- or dimethylamino-group,
  the spacer group is a linear $C_1$-$C_6$ hydrocarbon radical, more preferably still the linear $C_3$ hydrocarbon radical,
  in the formulae —SiOR and —Si(OR)$_2$, R is a hydrogen atom or an alkyl radical having from 1 to 4 carbon atoms, preferably methyl or ethyl,
  the diene elastomer is a butadiene/styrene copolymer.

The modified diene elastomer according to an embodiment the invention can be prepared according to a process including the modification of the elastomer by reaction of a living diene elastomer with an agent of trialkoxysilane type, bearing or not bearing another function capable of interacting with a reinforcing filler, known by a person skilled in the art to react with a living elastomer chain end. According to the invention, the process can be continuous or batchwise.

Such a synthesis process comprises the following stages:
  anionic polymerization of at least one conjugated diene monomer in the presence of a polymerization initiator,
  modification of the living diene elastomer bearing an active site obtained in the preceding stage by a non-polymerizable functionalization agent of trialkoxysilane type, the alkoxy functions being or not being hydrolysable to give a silanol function, optionally bearing another function capable of interacting with a reinforcing filler, said functionalization agent bonding at the chain end to at least one living chain of the elastomer via its silicon atom.

Use may be made, as polymerization initiator, of any known monofunctional anionic initiator. However, an initiator comprising an alkali metal, such as lithium, is preferably used. Those comprising a carbon-lithium bond and a nitrogen-lithium bond are suitable in particular as organolithium initiators. Representative compounds are aliphatic organolithium compounds, such as ethyllithium, n-butyllithium (n-BuLi) or isobutyllithium, or lithium amides obtained from a cyclic secondary amine, such as pyrrolidine and hexamethyleneimine.

The polymerization is preferably carried out in the presence of an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The polymerization can be carried out continuously or batchwise, in dispersion or in solution. The polymerization is generally carried out at a temperature of between 20° C. and 150° C. and preferably in the vicinity of 30° C. to 110° C.

The diene elastomer can have any microstructure which depends on the polymerization conditions used. The elastomer can be block, random, sequential, microsequential, and the like. The microstructure of this elastomer can be determined by the presence or absence of a modifying and/or randomizing agent and the amounts of modifying and/or randomizing agent employed.

The living diene elastomer resulting from the polymerization is subsequently modified by reaction with the functionalization agent in order to prepare the modified diene elastomer according to an embodiment of the invention.

The time for reaction between the living diene elastomer resulting from the polymerization and the functionalization agent can be between 10 seconds and 2 hours.

A person skilled in the art knows how to determine the operating conditions of the modification reaction in order to result in the composition of the desired modified diene elastomer.

According to an alternative form of preparation, the modified diene elastomer according to and embodiment of the invention is obtained by mixing at least two diene elastomers of the same nature, which are modified by the same functionalization agent, and exhibiting a different composition, in order to obtain the targeted contents of coupled entity, star-branched entity, entity functionalized at the chain end and non-functional entity.

The content of non-functional entity in the mixture can be regulated by adding a non-functional diene elastomer, the polymerization of which is stopped, for example by addition of methanol, and which has not been subjected to a modification stage, directly to the mixture or to each diene elastomer before mixing.

The modified diene elastomers with a different composition of the mixture are respectively obtained by carrying out the modification stage while varying the molar ratio of the functionalization agent to the polymerization initiator. Thus, with a ratio ranging from 0.40 to 0.75, preferably from 0.45 to 0.65 and more preferably still from 0.45 to 0.55, the formation of coupled entities is favoured. In the same way, with a ratio ranging from 0.15 to 0.40, preferably from 0.20 to 0.35 and more preferably still from 0.30 to 0.35, star-branched (3 branches) entities are predominantly formed.

With a ratio of greater than or equal to 0.75, preferably of greater than 1, entities functionalized at the chain end are predominantly formed.

Thus, by way of example, at least two modified diene elastomers of different composition, the elastomer being of the same nature (identical microstructure and identical macrostructure) before modification, are prepared with one and the same functionalization agent, the proportions of which are varied according to the predominant entity targeted. For each modified diene elastomer, the content of non-functional elastomer is regulated at approximately 8%.

On conclusion of their batchwise synthesis, the composition of the modified diene elastomers is determined, for example by the high-resolution SEC technique. The proportion of each elastomer in the mixture can subsequently be easily evaluated by a person skilled in the art in order to achieve the targeted content of each of the entities in the modified diene elastomer according to an embodiment of the invention.

The mixing of these elastomers can be carried out in an inert solvent, for example an aliphatic or alicyclic hydrocarbon, such as pentane, hexane, heptane, isooctane or cyclohexane, or an aromatic hydrocarbon, such as benzene, toluene or xylene, which can be the same as the polymerization solvent. The mixing will then be carried out at a temperature of between 20° C. and 120° C. and preferably in the vicinity of 30° C. to 90° C.

These elastomers of different compositions can be synthesized preferably batchwise in a stirred reactor, assumed to be perfectly stirred according to a person skilled in the art, in a way known per se.

The inventors have also developed an innovative process which makes it possible to prepare the modified elastomer according to an embodiment of the invention continuously, whereas, until now, the control of the distributions of entities could only be envisaged batchwise. The stages of polymerization and of modification by the functionalization agent take place continuously on one and the same production line.

A person skilled in the art will know how to carry out the anionic polymerization continuously of at least one conjugated diene monomer, which polymerization is known per se.

As regards the stage of modification by a functionalization agent of the living elastomer bearing an active site obtained after polymerization, this is characterized by a specific distribution in residence time and a specific kinetic model.

Thus, the stage of modification of the diene elastomer takes place continuously in a functionalization device, by bringing the living diene elastomer bearing an active site obtained after polymerization into contact with a non-polymerizable functionalization agent comprising (a), if appropriate, a function capable of interacting with a reinforcing filler and (b) a trialkoxysilane group, the hydrolysable or non-hydrolysable alkoxy radical having from 1 to 10 carbon atoms, the modification comprising three reactions in series

| Reaction | Mechanism |
| --- | --- |
| R1 | $PLi + A \xrightarrow{k_1} PA$ |
| R2 | $PLi + PA \xrightarrow{k_2} P_2A$ |

-continued

| Reaction | Mechanism |
|---|---|
| R3 | $PLi + P_2A \xrightarrow{k_3} P_3A$ | where:
  A represents the functionalization agent,
  PLi represents a living elastomer chain,
  PA represents the elastomer functionalized at the chain end,
  $P_2A$ represents the coupled elastomer,
  $P_3A$ represents the star-branched elastomer comprising three branches, and
  $k_1$ represents the kinetic constant of the reaction $R_i$,
being carried out according to the following rate law:

| Reactions | Reaction rate |
|---|---|
| R1 | $V_1 = k_1[PLi][A]$ |
| R2 | $V_2 = k_2[PLi][PA]$ |
| R3 | $V_3 = k_3[PLi][P_2A]$ | where:
  $k_1$, $k_2$ and $k_3$ are the kinetic constants respectively of the reactions R1, R2 and R3 (expressed in $(m^3/mol) \cdot s^{-1}$),
  [PLi] is the concentration of living chains (expressed in $mol/m^3$),
  [A] is the concentration of modification agent A (expressed in $mol/m^3$),
  [PA] is the concentration of elastomer functionalized at the chain end (expressed in $mol/m^3$),
  $[P_2A]$ is the concentration of coupled elastomer (expressed in $mol/m^3$),
  $[P_3A]$ is the concentration of star-branched elastomer comprising three branches (expressed in $mol/m^3$),
the ratio K of the kinetic constants defined as:

$$K = \frac{k_1}{k_2} = \frac{k_2}{k_3}$$

being greater than 1, and
  the residence time distribution in the functionalization device being expressed according to one of the following equations 1 and 3:
    (i) in a functionalization device comprising at least one continuous tubular reactor or comprising at least one cascade of at least two stirred reactors, $$E_1(t) = \frac{1}{2}\left(\frac{P}{\pi\theta_1 t}\right)^{\frac{1}{2}} e^{-\frac{P(\theta_1-t)^2}{4\theta_1 t}} \quad \text{Eq. 1}$$

in which:
  P is the non-dimensional parameter of resistance to dispersion,
  $\theta_1$ is the residence time, defined as the reactor volume/total flow rate by volume ratio, preferably equal to at least 0.1 minute and at most to 10 minutes, more preferably at most to 5 minutes,
  t is the time variable of the residence time distribution, (ii) in a functionalization device which is a combination of the device (i) and of a device comprising at least one continuous stirred reactor, exhibiting a residence time distribution characterized by the following equation:

$$E_2(t) = \frac{e^{\left(-\frac{t}{\theta_2}\right)}}{\theta_2} \quad \text{Eq. 2}$$

in which:
  $\theta_2$ is the residence time, defined as the reactor volume/total flow rate by volume ratio, preferably of between 0 and 60 minutes and more preferably between 5 and 50 minutes,
  t is the time variable of the residence time distribution,
    the device (ii) exhibiting a residence time distribution characterized by the following equation 3, which is the result of the convolution of the equations 1 and 2:

$$E_{12}(t) = \int_0^t E_1(t-T)E_2(T)\,dT \quad \text{Eq. 3}$$

$$E_{12}(t) = \int_0^t \frac{1}{2}\left(\frac{P}{\pi\theta_1(t-T)}\right)^{\frac{1}{2}} e^{-\frac{P(\theta_1-(t-T))^2}{4\theta_1(t-T)}} \frac{e^{\left(-\frac{T}{\theta_2}\right)}}{\theta_2}\,dT$$

in which:
  $\theta_1$ and $\theta_2$ are the residence times as defined above,
  P is the non-dimensional parameter of resistance to dispersion,
  t is the time variable of the residence time distribution,
  T is the integration variable.

In these equations, P is the non-dimensional parameter of resistance to dispersion, as defined in the bibliography "Villermeaux, J; Génie de la réaction chimique [Engineering of the Chemical Reaction]; 1993". It is preferably greater than 6.9, more preferably greater than or equal to 9.6, indeed even greater than or equal to 12. P is not limited by a maximum value in the context of the invention. It can tend towards infinity. If it tends towards infinity, the device in which the functionalization takes place then behaves as an ideal reactor with a flow of plug-flow type.

One of the essential elements of an embodiment of the invention lies in the choice of this functionalization agent in order to correspond to the kinetic model of the functionalization defined above, with a ratio of the kinetic constants, denoted K, of greater than 1.

This ratio K is greater than 1, preferably greater than or equal to 10, indeed even greater than or equal to 100. Below this value of 1, the distribution of the different entities results in a modified elastomer, the use of which in a reinforced rubber composition is reflected by processing and hysteresis properties which are not always optimized for satisfactory use in a tire tread. There is no upper limit to K. A person skilled in the art will understand that the bigger K is, the more the reaction is controlled by the molar ratio of the functionalization agent to the polymerization initiator. When this value tends towards infinity, the process is quantitative and stoichiometric.

The functionalization agent in accordance with an embodiment of the invention can bear an alkoxysilane function, which can be hydrolysed to give a silanol function, or also a non-hydrolysable alkoxysilane function, and optionally another function capable of interacting with a reinforcing filler, the two functions being directly bonded to one another or being bonded via a spacer group. The other function capable of interacting with a reinforcing filler and the spacer group are as defined above.

The functionalization agent can be represented by the following formula 1:

Formula 1 in which:
- R is a saturated or unsaturated, cyclic or non-cyclic, divalent $C_1$-$C_{18}$ aliphatic hydrocarbon radical or divalent $C_6$-$C_{18}$ aromatic hydrocarbon radical, preferably a linear or branched, divalent $C_1$-$C_{10}$ aliphatic hydrocarbon radical, more preferably a linear divalent $C_1$-$C_6$ aliphatic hydrocarbon radical and more preferably still the linear $C_3$ hydrocarbon radical,
- X is a hydrogen atom or a function capable of interacting with a reinforcing filler,
- the R' radicals, which are substituted or unsubstituted and identical or different, represent a $C_1$-$C_{10}$, indeed even $C_1$-$C_8$, alkyl group, preferably a $C_1$-$C_4$ alkyl group, more preferably methyl and ethyl.

The function capable of interacting with a reinforcing filler is as defined above.

According to alternative forms of the invention, the function capable of interacting with a reinforcing filler is a protected or unprotected primary amine, a protected or unprotected secondary amine or a tertiary amine. The nitrogen atom can then be substituted by two identical or different groups which can be a trialkylsilyl radical, the alkyl group having from 1 to 4 carbon atoms, or a $C_1$-$C_{10}$, preferably $C_1$-$C_4$, alkyl radical, more preferably a methyl or ethyl radical, or else the two substituents of the nitrogen form, with the latter, a heterocycle comprising a nitrogen atom and at least one carbon atom, preferably from 2 to 6 carbon atoms.

Mention may be made, for example, as functionalization agent, of (N,N-dialkylaminopropyl)trialkoxysilanes, (N-alkylaminopropyl)trialkoxysilanes, the secondary amine function of which is protected by a trialkylsilyl group, and aminopropyltrialkoxysilanes, the primary amine function of which is protected by two trialkylsilyl groups. Preferably, the functionalization agent can be chosen from (3-N,N-dimethylaminopropyl)trimethoxysilane, (3-N,N-dimethylaminopropyl)triethoxysilane, (3-N,N-diethylaminopropyl)trimethoxysilane, (3-N,N-diethylaminopropyl)triethoxysilane, (3-N,N-dipropylaminopropyl)trimethoxysilane, (3-N, N-di propylaminopropyl)triethoxysilane, (3-N, N-dibutylaminopropyl)trimethoxysilane, (3-N, N-dibutylaminopropyl)triethoxysilane, (3-N,N-dipentylaminopropyl)trimethoxysilane, (3-N,N-dipentylaminopropyl)triethoxysilane, (3-N,N-dihexylaminopropyl)trimethoxysilane, (3-N,N-dihexylaminopropyl)triethoxysilane, (3-hexamethyleneaminopropyl)trimethoxysilane, (3-hexamethyleneaminopropyl)triethoxysilane, (3-morpholinopropyl)trimethoxysilane, (3-morpholinopropyl)triethoxysilane, (3-piperidinopropyl)trimethoxysilane or (3-piperidinopropyl)triethoxysilane. More preferably, the coupling agent is (3-N,N-dimethylaminopropyl)trimethoxysilane.

Preferably, the functionalization agent can be chosen from (3-N,N-methyltrimethylsilylaminopropyl)trimethoxysilane, (3-N,N-methyltrimethylsilylaminopropyl)triethoxysilane, (3-N,N-ethyltrimethylsilylaminopropyl)trimethoxysilane, (3-N,N-ethyltrimethylsilylaminopropyl)triethoxysilane, (3-N,N-propyltrimethylsilylaminopropyl)trimethoxysilane or (3-N,N-propyltrimethylsilylaminopropyl)triethoxysilane. More preferably, the coupling agent is (3-N, N-methyltrimethylsilylaminopropyl)trimethoxysilane.

Preferably, the functionalization agent can be chosen from (3-N,N-bistrimethylsilylaminopropyl)trimethoxysilane and (3-N,N-bistrimethylsilylaminopropyl)triethoxysilane. More preferably, the coupling agent is (3-N,N-bistrimethylsilylaminopropyl)trimethoxysilane.

According to alternative forms of the invention, the function capable of interacting with a reinforcing filler is an isocyanate function. Preferably, the functionalization agent can be chosen from (3-isocyanatopropyl)trimethoxysilane and (3-isocyanatopropyl)triethoxysilane.

According to alternative forms of the invention, the function capable of interacting with a reinforcing filler is an imine function. Preferably, the functionalization agent can be chosen from N-(1,3-dimethylbutylidene)-3-(trimethoxysilyl)-1-propanamine, N-(1,3-dimethylbutylidene)-3-(triethoxysilyl)-1-propanamine, N-(1,3-methylethylidene)-3-(trimethoxysilyl-1-propanamine, N-(1,3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylidene)-3-(triethoxysilyl)-1-propanamine, N-(4-N,N-dimethylaminobenzylidene)-3-(trimethoxysilyl)-1-propanamine, N-(4-N,N-dimethylaminobenzylidene)-3-(triethoxysilyl)-1-propanamine, N-(cyclohexylidene)-3-(trimethoxysilyl)-1-propanamine, N-(cyclohexylidene)-3-(triéthoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole or N-(3-triethoxysilylpropyl)-4,5-imidazole.

According to alternative forms of the invention, the function capable of interacting with a reinforcing filler is an cyano function. Preferably, the functionalization agent can be chosen from (3-cyanopropyl)trimethoxysilane and (3-cyanopropyl)triethoxysilane.

According to alternative forms of the invention, the function capable of interacting with a reinforcing filler is a protected or unprotected thiol function. Mention may be made, by way of example, of (S-trialkylsilylmercaptopropyl)trialkoxysilanes. Preferably, the functionalization agent can be chosen from (S-trimethylsilylmercaptopropyl)trimethoxysilane, (S-trimethylsilylmercaptopropyl)triethoxysilane, (S-tert-butyldimethylsilylmercaptopropyl)trimethoxysilane or (S-tert-butyldimethylsilylmercaptopropyl)triethoxysilane.

According to alternative forms of the invention, the function capable of interacting with a reinforcing filler is a carboxylate function. Mention may be made, as carboxylate function, of acrylates or methacrylates. Such a function is preferably a methacrylate. Preferably, the functionalization agent can be chosen from (3-methacryloyloxypropyl)trimethoxysilane and (3-methacryloyloxypropyl)triethoxysilane.

According to alternative forms of the invention, the function capable of interacting with a reinforcing filler is an epoxide function. Preferably, the functionalization agent can be chosen from (2-glycidyloxyethyl)trimethoxysilane, (2-glycidyloxyethyl)triethoxysilane, (3-glycidyloxypropyl) trimethoxysilane, (3-glycidyloxypropyl)triethoxysilane, 2-(3,4-epoxycyclohexyl)ethyltrimethoxysilane or 2-(3,4-epoxycyclohexyl)ethyltriethoxysilane.

According to alternative forms of the invention, the function capable of interacting with a reinforcing filler is a protected or unprotected primary phosphine function, a protected or unprotected secondary phosphine function or a tertiary phosphine function. Preferably, the functionalization agent can be chosen from (3-P,P-bistrimethylsilyiphosphinopropyl)trimethoxysilane, (3-P,P-bistrimethylsilylphosphinopropyl)triethoxysilane, (3-methyltrimethylsilylphosphinopropyl)trimethoxysilane, (3-methyltrimethylsilylphosphinopropyl)triethoxysilane, (3-ethyltrimethylsilylphosphinopropyl)trimethoxysilane, (3-ethyltrimethylsilylphosphinopropyl)triethoxysilane, (3-dimethylphosphinopropyl)trimethoxysilane, (3-dimethylphosphinopropyl)triethoxysilane, (3-diethylphosphinopropyl)trimethoxysilane, (3-diethylphosphinopropyl)triethoxysilane, (3-ethylmethylphosphinopropyl) trimethoxysilane, (3-ethylmethylphosphinopropyl) triethoxysilane, (3-diphenylphosphinopropyl) trimethoxysilane or (3-diphenylphosphinopropyl) triethoxysilane.

According to the alternative forms of the invention according to which the functionalization agent bears a protected primary or secondary amine function, the synthesis process can be continued by a stage of deprotection of the primary or secondary amine. This stage is carried out after the modification reaction. The chains functionalized by the protected amine group can, by way of example, be reacted with an acid, a base, a fluorinated derivative, such as tetrabutylammonium fluoride, a silver salt, such as silver nitrate, and the like, in order to deprotect this amine function. These different methods are described in the work Protective Groups in Organic Synthesis, T. W. Green and P. G. M. Wuts, Third Edition, 1999. This deprotection stage can have the effect of hydrolysing all or a portion of the hydrolysable alkoxysilane functions of the modified diene elastomer in order to convert them into silanol functions.

According to the alternative forms of the invention according to which the functionalization agent bears a protected thiol function, the synthesis process can be continued by a stage of deprotection of the thiol. This stage is carried out after the modification reaction. The chains functionalized by the protected thiol group can, by way of example, be reacted with water, an alcohol or an acid (hydrochloric acid, sulphuric acid, carboxylic acid). This deprotection stage can have the effect of hydrolysing all or a portion of the hydrolysable alkoxysilane functions of the modified diene elastomer in order to convert them into silanol functions.

According to the alternative forms of the invention according to which the functionalization agent bears a protected primary or secondary phosphine function, the synthesis process can be continued by a stage of deprotection of the phosphine. This stage is carried out after the modification reaction. The chains functionalized by the protected phosphine group can, by way of example, be reacted with water, an alcohol or an acid (hydrochloric acid, sulphuric acid, carboxylic acid). This deprotection stage can have the effect of hydrolysing all or a portion of the hydrolysable alkoxysilane functions of the modified diene elastomer in order to convert them into silanol functions.

According to alternative forms of the invention, the synthesis process can comprise a stage of hydrolysis of the hydrolysable alkoxysilane functions by addition of an acidic, basic or neutral compound, as described in the document EP 2 266 819 A1. The hydrolysable functions are then converted into silanol functions.

The process for the synthesis of the modified diene elastomer according to an embodiment of the invention can be continued in a way known per se by the stages of recovery of the modified elastomer.

According to alternative forms of this process, these stages comprise a stripping stage for the purpose of recovering the elastomer resulting from the prior stages in dry form. This stripping stage can have the effect of hydrolysing all or a portion of the hydrolysable alkoxysilane functions of the modified diene elastomer in order to convert them into silanol functions. Advantageously, at least 50 to 70 mol % of the functions can thus be hydrolysed.

A further subject-matter of the invention is a reinforced rubber composition based on at least one reinforcing filler and on an elastomer matrix comprising at least one modified diene elastomer according to the invention.

The elastomer matrix can comprise up to 100 phr of modified diene elastomer according to an embodiment the invention. In the context of the reinforced rubber composition, the term "modified diene elastomer according to the invention" is also understood to mean any mixture of at least two modified elastomers according to the invention.

According to alternative forms of the invention, the elastomer matrix can also comprise at least one diene elastomer other than the modified diene elastomer according to the invention. This or these diene elastomers other than the modified diene elastomer according to the invention can be chosen from the diene elastomers conventionally used in tires, such as natural rubber or a synthetic elastomer, or also another functionalized, coupled or star-branched elastomer. This or these diene elastomers other than the modified diene elastomer according to an embodiment the invention can then be present from 1 to 70 parts by weight per 100 parts of modified diene elastomer according to the invention.

According to other alternative forms, the matrix is composed solely of this modified diene elastomer according to the present invention.

Use may be made, as reinforcing filler, of any type known for its abilities to reinforce a rubber composition which can be used for the manufacture of tires, for example carbon black, a reinforcing inorganic filler, such as silica, with which is combined, in a known way, a coupling agent, or also a mixture of these two types of filler.

According to a particularly advantageous alternative form of the invention, the reinforcing filler is predominantly other than carbon black; more preferably, it comprises more than 50% by weight, of the total weight of the filler, of one or more fillers other than carbon black, in particular a reinforcing inorganic filler, such as silica; indeed, it is even exclusively composed of such a filler.

According to this other alternative form, when carbon black is also present, it can be used at a content of less than 20 phr, more preferably of less than 10 phr (for example, between 0.5 and 20 phr, in particular from 1 to 10 phr).

Preferably, the amount of total reinforcing filler (carbon black and/or other reinforcing filler such as silica) is between 10 and 200 phr, more preferably between 30 and 150 phr, the optimum being, in a known way, different according to the specific applications targeted.

All carbon blacks, used individually or in the form of mixtures, are suitable as carbon blacks, in particular the blacks conventionally employed in tires or their treads ("tire-grade" blacks). These carbon blacks can be used in the isolated state, as available commercially, or in any other form, for example as support for some of the rubber additives used.

"Reinforcing inorganic filler" should be understood here as meaning any other inorganic or mineral filler, whatever its colour and its origin (natural or synthetic). capable of reinforcing by itself alone, without means other than an intermediate coupling agent, a rubber composition intended for the manufacture of tires; such a filler is generally characterized, in a known way, by the presence of hydroxyl (☐OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$, in particular between 60 and 300 $m^2/g$. Mention will also be made of mineral fillers of the aluminous type, in particular alumina ($Al_2O_3$) or aluminium (oxide) hydroxides, or else reinforcing titanium oxides, for example described in U.S. Pat. No. 6,610,261 and U.S. Pat. No. 6,747,087. Also suitable as reinforcing fillers are reinforcing fillers of another nature, in particular carbon black, provided that these reinforcing fillers are covered with a siliceous layer or else comprise, at their surface, functional sites, in particular hydroxyl sites, requiring the use of a coupling agent in order to establish the bond between the filler and the elastomer. Mention may be made, by way of example, for example, of carbon blacks for tires, such as described, for example, in patent documents WO 96/37547 and WO 99/28380.

The physical state under which the reinforcing filler is provided is not important, whether it is in the form of a powder, of microbeads, of granules or also of beads. Of course, the term "reinforcing inorganic filler" is also understood to mean mixtures of different reinforcing fillers, in particular of highly dispersible silicas as described above.

When silica is present in the composition as reinforcing filler, use may be made, as coupling agents, of organosilanes, in particular alkoxysilane polysulphides or mercaptosilanes, or also of at least bifunctional polyorganosiloxanes. Silica/elastomer bonding agents, in particular, have been described in a large number of documents, the best known being bifunctional alkoxysilanes, such as alkoxysilane polysulphides.

In the compositions in accordance with an embodiment of the invention, the amount of coupling agent is advantageously less than 20 phr, it being understood that it is generally desirable to use as little as possible of it. The amount thereof is preferably between 0.5 and 12 phr. The presence of the coupling agent depends on the presence of the reinforcing inorganic filler. Its content is easily adjusted by a person skilled in the art according to the content of this filler; it is typically of the order of 0.5% to 15% by weight, with respect to the amount of reinforcing inorganic filler.

The rubber compositions in accordance with an embodiment of the invention can also comprise, in addition to the coupling agents, coupling activators, agents for covering the fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with an embodiment of the invention can also comprise reinforcing organic fillers which can replace all or a portion of the carbon blacks or of the other reinforcing fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

The rubber compositions in accordance with an embodiment of the invention can also comprise all or a portion of the normal additives customarily used in elastomer compositions intended for the manufacture of tires, such as, for example, pigments, protective agents, such as antiozone waxes, chemical antiozonants or antioxidants, antifatigue agents, reinforcing or plasticizing resins, methylene acceptors (for example, phenolic novolak resin) or methylene donors (for example, HMT or H3M), as described, for example, in Application WO 02/10269, a crosslinking system based either on sulphur or on sulphur donors and/or on peroxides and/or on bismaleimides, vulcanization accelerators, vulcanization activators, adhesion promoters, such as cobalt-based compounds, plasticizing agents, preferably non-aromatic or very slightly aromatic plasticizing agents selected from the group consisting of naphthenic oils, paraffinic oils, MES oils, TDAE oils, ether plasticizers, ester plasticizers, hydrocarbon resins exhibiting a high Tg, preferably of greater than 30° C., such as described, for example, in Applications WO 2005/087859, WO 2006/061064 and WO 2007/017060, and the mixtures of such compounds.

Another subject-matter of the invention is a process for the preparation of a rubber composition as described above.

The composition is manufactured in appropriate mixers, using two successive phases of preparation well known to those skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process in accordance with an embodiment of the invention for preparing a rubber composition according to the invention comprises at least the following stages:

carrying out, at a maximum temperature of between 110° C. and 190° C., preferably between 130° C. and 180° C., a first step of thermomechanical working (sometimes described as "non-productive" phase) of the base constituents necessary for the rubber composition, with the exception of the crosslinking system and, if appropriate, an adhesion promoter, by intimately incorporating, by kneading in one or more stages, ingredients of the composition in the elastomer matrix comprising the modified diene elastomer according to the invention, then carrying out, at a temperature lower than the maximum temperature of the first step, preferably of less than 110° C., a second step of mechanical working during which the crosslinking system and, if appropriate, an adhesion promoter are incorporated.

According to alternative forms of the invention, the process for the preparation of the rubber composition comprises the stages of preparation of the modified diene elastomer according to the invention as described above according to its different methods of synthesis.

The final composition thus obtained can subsequently be calendered, for example in the form of a sheet or a plaque or also extruded, for example in order to form a rubber profiled element which can be used as a semi-finished rubber product intended for the tire.

Another subject-matter of the invention is a semi-finished product made of rubber comprising a reinforced rubber composition according to the invention.

Another subject-matter of the invention is a tire, at least one of the constituent elements of which is a semi-finished rubber product comprising a reinforced rubber composition according to the invention.

Due to the improvement in the hysteresis/processing compromise which characterizes a reinforced rubber composition according to the invention, it should be noted that such a composition can constitute any semi-finished product of the tire and very particularly the tread, thus reducing its rolling resistance.

The abovementioned characteristics of the present invention, and also others, will be better understood on reading the following description of several implementational examples of the invention, given by way of illustration and without limitation.

I—Measurements and Tests Used (a) Determination of the Molar Mass Distribution of the Elastomers by the Size Exclusion Chromatography (Conventional SEC) Technique The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, conventional SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 $g \cdot l^{-1}$. The solution is then filtered through a filter with a porosity of 0.45 µm before injection.

The apparatus used is a Waters Alliance chromatographic line. The elution solvent is either tetrahydrofuran or tetrahydrofuran +1 vol % of diisopropylamine +1 vol % of triethylamine, the flow rate is 1 $ml \cdot min^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 25% by weight of units of styrene type, 23% by weight of units of 1,2-type and 50% by weight of units of trans-1,4-type.

(b) Determination of the Distribution of the Chains Functionalized at the Chain End, the Chains Functionalized in the Middle of the Chain and the Star-Branched (3 Branches) Chains by the High-Resolution Size Exclusion Chromatography (High-Resolution SEC) Technique The high-resolution SEC technique is used to determine the percentages by weight of the various populations of chains present in a polymer sample.

There is no specific treatment of the polymer sample before analysis. The latter is simply dissolved in the elution solvent at a concentration of approximately 1 $g \cdot l^{-1}$. The solution is then filtered through a filter with a porosity of 0.45 µm before injection.

The apparatus used is a Waters Alliance 2695 chromatographic line. The elution solvent is tetrahydrofuran, the flow rate is 0.2 $ml \cdot min^{-1}$ and the temperature of the system is 35° C. A set of three identical columns in series is used (Shodex, length 300 mm, diameter 8 mm). The number of theoretical plates of the set of columns is greater than 22 000. The volume of the solution of the polymer sample injected is 50 µl. The detector is a Waters 2414 differential refractometer and the software for making use of the chromatographic data is the Waters Empower system.

The calculated molar masses are relative to a calibration curve produced for SBRs having the following microstructure: 25% by weight of units of styrene type, 23% by weight of units of 1,2-type and 50% by weight of units of trans-1,4-type.

(c) Characterization of the Microstructure of the Elastomers by the Near-Infrared Spectroscopy (NIR) Technique Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}C$ NMR. The styrene content and the microstructure are then calculated from the NIR spectrum of an elastomer film having a thickness of approximately 730 µm. The spectrum is acquired in transmission mode between 4000 and 6200 $cm^{-1}$ with a resolution of 2 $cm^{-1}$ using a Bruker Tensor 37 Fourier-transform near-infrared spectrometer equipped with an InGaAs detector cooled by the Peltier effect.

(d) Determination of the Mooney $ML_{(1+4)}100°$) C Viscosities for the Elastomers and the Rubber Compositions According to Standard ASTM D-1646

Use is made of an oscillating consistometer as described in Standard ASTM D-1646. The Mooney plasticity measurement is carried out according to the following principle: the elastomer (or the composition in the raw state (i.e., before curing)) is moulded in a cylindrical chamber heated to 100° C. After preheating for one minute, the rotor rotates within the test specimen at 2 $rev \cdot min^{-1}$ and the working torque for maintaining this movement after rotating for 4 minutes is measured. The Mooney plasticity ($ML_{(1+4)}$ is expressed in "Mooney unit" (MU, with 1 MU=0.83 N·m).

(e) Determination of the Glass Transition Temperatures (Tg) of the Elastomers by Means of a Differential Scanning Calorimeter (f) Determination of the Intrinsic Viscosity of the Elastomers at 25° C. Starting from a 0.1 $g \cdot dl^{-1}$ Solution of Elastomer in Toluene, According to the Following Principal:

The intrinsic viscosity is determined by the measurement of the flow time t of the polymer solution and of the flow time to of the toluene in a capillary tube.

The flow time of the toluene and the flow time of the 0.1 $g \cdot dl^{-1}$ polymer solution are measured in an Ubbelohde tube (diameter of the capillary 0.46 mm, capacity from 18 to 22 ml) placed in a bath thermostatically controlled at 25±0.1° C. The intrinsic viscosity is obtained by the following relationship:

$$\eta_{inh} = \frac{1}{C}\ln\left[\frac{(t)}{(t_0)}\right]$$

with:
C: concentration of the solution of polymer in toluene in g·dl$^{-1}$
t: flow time of the solution of polymer in toluene in seconds,
$t_0$: flow time of the toluene in seconds,
$\eta_{inh}$: intrinsic viscosity, expressed in dl·g$^{-1}$.

The measurement of the "initial" intrinsic viscosity, which is the viscosity of the polymer before functionalization, and of the "final" intrinsic viscosity, which is the viscosity of the polymer after functionalization, makes it possible to calculate the jump in viscosity, which is the ratio of the "final" intrinsic viscosity to the "initial" intrinsic viscosity.

(g) Determination of the Cold Flow of the Elastomers (CF$_{(1+6)}$100°) C) According to the Following Measurement Method:

It is a matter of measuring the weight of rubber extruded through a calibrated die over a given time (6 hours) and under fixed conditions (T=100° C.). The die has a diameter of 6.35 mm and a thickness of 0.5 mm and is located at the bottom and at the centre of a hollowed-out cylindrical dish with a diameter of 52 mm. 40±4 g of rubber, formed beforehand into a pellet (thickness of 2 cm and diameter of 52 mm), are placed in this device. A calibrated piston weighing 1 kg (±5 g) is positioned on the rubber pellet. The assembly is subsequently placed in an oven at 100° C.±0.5° C.

As the conditions are not stabilized during the first hour in the oven, the product extruded at t=1 hour is cut off and then discarded.

The measurement is subsequently continued for 6 hours±5 min, during which the product is left in the oven. On conclusion of the 6 hours, the sample of product extruded is cut off and then weighed. The result of the measurement is the weight of rubber weighed. The lower this result, the more resistant the elastomer is to cold flow.

(h) Determination of the Tan δ Max Dynamic Properties

The dynamic properties, in particular tan δ max, are measured on a viscosity analyser (Metravib VA4000) according to Standard ASTM D 5992-96. The response of a sample of vulcanized composition (cylindrical test specimen with a thickness of 2 mm and a cross-section of 79 mm$^2$), subjected to a simple alternating sinusoidal shear stress, at a frequency of 10 Hz, is recorded under standard temperature conditions (23° C.) according to Standard ASTM D 1349-99. A peak-to-peak strain amplitude sweep from 0.1% to 50% (forward cycle) and then from 50% to 0.1% (return cycle) is carried out. The result made use of is the loss factor tan δ. For the return cycle, the maximum value of tan δ observed (tan δ max) is indicated. This value is representative of the hysteresis of the material and in the present case of the rolling resistance: the smaller the value of tan δ max, the lower the rolling resistance.

(i) Determination of the Distribution of the Entities of a Modified Elastomer

1—Example of the Determination of the Ratio of Kinetic Constants (K) of the Kinetic Model of Functionalization in a Batchwise Stirred Reactor Experimental Determination of the Percentage by Weight of the Chains Functionalized at the Chain End, of the Chains Functionalized in the Middle of the Chain and of the Star-Branched (3 Branches) Chains and of the Jump in Viscosity as a Function of the (3-N,N-dimethylaminopropyl)trimethoxysilane/n-BuLi Molar Ratio 91.6 ml (70.5 g) of methylcyclohexane, 14.8 ml (9.65 g) of butadiene and 0.49 ml of a 0.078 mol·l$^{-1}$ solution of tetrahydrofurfuryl ether in methylcyclohexane are introduced into eleven 250 ml glass bottles (Steinie bottles). After neutralization of the impurities in the solution to be polymerized by addition of n-butyllithium (n-BuLi), 1.90 ml of 0.097 mol·l$^{-1}$ n-BuLi in methylcyclohexane are added. The polymerization is carried out at 60° C.

After 15 minutes, the degree of conversion of monomer reaches 95%. This content is determined by weighing an extract dried at 140° C. under a reduced pressure of 200 mmHg. A control bottle (bottle No. 1) is stopped with an excess of methanol with respect to the lithium. The "initial" intrinsic viscosity measured is 0.66 dl·g$^{-1}$. 0.88 ml of a 0.1 mol·l$^{-1}$ solution of (3-N,N-dimethylaminopropyl)trimethoxysilane in methylcyclohexane is added to the solutions of living polymer (0.48 molar eq. vs Li) present in bottles 2 to 9, 0.73 ml of this same solution is added to bottle 10 (0.40 molar eq. vs Li) and 1.83 ml of this same solution are added to bottle 11 (1.0 molar eq. vs Li). After reacting at 60° C. for 15 minutes, the solutions are antioxidized by addition of 0.4 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenytenediamine. The polymers thus treated are separated from their solution by drying at 60° C. under reduced pressure and a nitrogen stream for 12 hours.

The "final" intrinsic viscosities, the jumps in viscosity, defined as the ratios of the "final" intrinsic viscosities to the "initial" intrinsic viscosity, and also the percentages by weight of the deactivated chains (P), of the chains functionalized at the chain end (PA), of the chains functionalized in the middle of the chain (P$_2$A) and of the star-branched chains (P$_3$A) are presented in Table 1 below.

TABLE 1

Change in the distribution of the entities P + PA/P$_2$A/P$_3$A and in the jump in viscosity as a function of the (3-N,N-dimethylaminopropyl)trimethoxysilane/n-BuLi molar ratio

| Bottle | (3-N,N-Dimethylaminopropyl)trimethoxysilane/Li molar ratio | Jump in viscosity | P + PA/P$_2$A/P$_3$A (wt. %) |
|---|---|---|---|
| 2 | 0.48 | | 12/77/10 |
| 3 | 0.48 | | 13/77/9 |
| 4 | 0.48 | | 13/78/9 |
| 5 | 0.48 | | 13/82/5 |
| 6 | 0.48 | | 13/83/5 |
| 7 | 0.48 | | 13, 83, 4). |
| 8 | 0.48 | | 14/83/4 |
| 9 | 0.48 | 1.54 | 11/84/4 |
| 10 | 0.40 | 1.61 | 15/53/25 |
| 11 | 1.00 | 1.09 | 72/20/7 |

The living diene elastomer is functionalized according to the reaction mechanism described above in the description.

The kinetic model for functionalization incorporated, according to a person skilled in the art, in a perfectly stirred batchwise reactor model (bibliography: Villermeaux, J; Génie de la reaction chimique; 1993) makes it possible to determine the distribution of the different entities. Furthermore, the chains can be deactivated (P) during the polymerization and/or functionalization stage. Thus, the final product is a mixture of deactivated elastomer (P), elastomer functionalized at the chain end (PA), elastomer functionalized in the middle of the chain ($P_2A$) and star-branched elastomer ($P_3A$).

For the experimental points of Table 1 above, the value of $K=10^{2\pm1}$ was estimated according to the description of the perfectly stirred batchwise reactor model, which represents the reactor used for these experiments.

Figure 1:
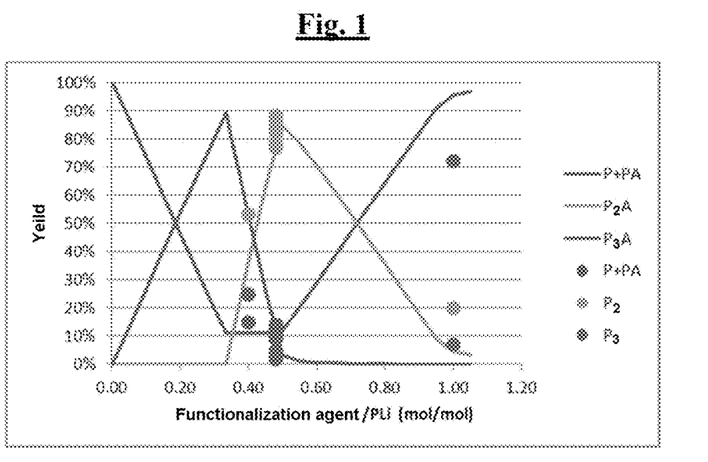
FIG. 1 is a graph illustrating a distribution of entities as a function of functionalization agent/living polymer chains (PLi) molar ratio according to Example 1.

The distribution of the entities P, PA, $P_2A$ and $P_3A$ as a function of the functionalization agent/living polymer chains (PLi) molar ratio is represented in FIG. 1: simulated (lines) and measured (points).

2—Example of the Determination of the Kinetics of Functionalization in a Batchwise Stirred Reactor Experimental Determination of the Percentage by Weight of the Chains Functionalized at the Chain End, of the Chains Functionalized in the Middle of the Chain and of the Star-Branched (3 Branches) Chains as a Function of the Coupling Time with (3-N,N-Dimethylaminopropyl)trimethoxysilane (~0.5 Mol Eq. Vs Li)

91.6 ml (70.5 g) of methylcyclohexane, 14.8 ml (9.65 g) of butadiene and 0.49 ml of a 0.078 mol·l$^{-1}$ solution of tetrahydrofurfuryl ether in methylcyclohexane are introduced into twenty-two 250 ml glass bottles (Steinie bottles). After neutralization of the impurities in the solution to be polymerized by addition of n-butyllithium (n-BuLi), 1.90 ml of 0.097 mol·l$^{-1}$ n-BuLi in methylcyclohexane are added. The polymerization is carried out at 60° C.

After 15 minutes, the degree of conversion of monomer reaches 95%. This content is determined by weighing an extract dried at 140° C. under a reduced pressure of 200 mmHg. 0.88 ml of a 0.1 mol·l$^{-1}$ solution of (3-N,N-dimethylaminopropyl)trimethoxysilane in methylcyclohexane are added to the living polymer solutions (0.48 molar eq. vs Li) present in the remaining twenty-one bottles. After reacting at 60° C. for 10 seconds (bottles 12, 13 and 14), 15 seconds (bottles 15, 16 and 17), 20 seconds (bottles 18, 19 and 20), 30 seconds (bottles 21 and 22), 2 minutes (bottle 23) and 15 minutes (bottles 24, 25, 26, 27, 28, 29, 30, 31 and 32), the solutions are antioxidized by addition of 0.4 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The polymers thus treated are separated from their solution by drying at 60° C. under reduced pressure and a nitrogen stream for 12 hours.

The percentages by weight of the deactivated chains (P), of the chains functionalized at the chain end (PA), of the chains functionalized in the middle of the chain ($P_2A$) and of the star-branched chains (PA) are presented in Table 2 below.

TABLE 2

Change in the distribution of the entities P + PA/$P_2A$/$P_3A$ as a function of the reaction time with (3-N,N-dimethylaminopropyl)trimethoxysilane

| Bottle | Reaction time with (3-N,N-dimethylaminopropyl)trimethoxysilane | P + PA (wt. %) | $P_2A$ (wt. %) | $P_3A$ (wt. %) |
|---|---|---|---|---|
| 12 | 10 s | 23 | 76 | 1 |
| 13 | 10 s | 23 | 76 | 1 |
| 14 | 10 s | 22 | 77 | 1 |
| 15 | 15 s | 19 | 79 | 1 |
| 16 | 15 s | 20 | 79 | 1 |
| 17 | 15 s | 19 | 79 | 1 |
| 18 | 20 s | 18 | 81 | 1 |
| 19 | 20 s | 17 | 81 | 1 |
| 20 | 20 (s) | 18 | 81 | 1 |
| 21 | 30 s | 16 | 82 | 2 |
| 22 | 30 s | 14 | 83 | 2 |
| 23 | 2 min | 11 | 86 | 2 |
| 24 | 15 min | 12 | 77 | 10 |
| 25 | 15 min | 13 | 77 | 9 |
| 26 | 15 min | 13 | 78 | 9 |
| 27 | 15 min | 13 | 82 | 5 |
| 28 | 15 min | 13 | 83 | 4 |
| 29 | 15 min | 13 | 83 | 4 |
| 30 | 15 min | 14 | 83 | 4 |
| 31 | 15 min | 11 | 84 | 4 |
| 32 | 15 min | 9 | 88 | 3 |

Figure 2:
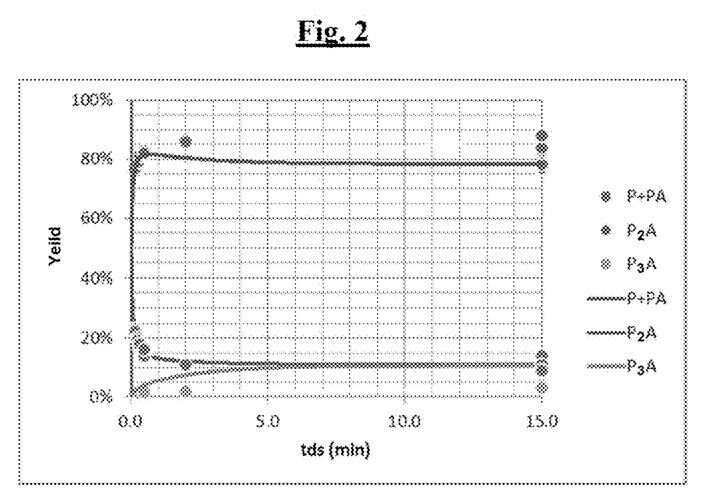
FIG. 2 is a graph illustrating simulated yields compared with measured yields as a function of reaction time in a perfectly stirred batchwise reactor according to Example 2.

By using the same kinetic model as the preceding example and the value of $K=10^{2\pm1}$, the value of $k_1[PLi]$, in the kinetic model, is estimated at $10^{4\pm0.2}$. The simulated yields are compared with the measured yields as a function of the reaction time in a perfectly stirred batchwise reactor in FIG. 2.

3—Example of the Determination of the Ratio of Kinetic Constants (K) of Functionalization in Continuous Configuration A variable amount of functionalization agent is injected into a continuous pilot-scale polymerization plant, at the outlet of the continuous stirred polymerization reactor, assumed to be perfectly stirred, in order to characterize the continuous functionalization section. The functionalization section is composed of a static mixer of Kenics type comprising 36 4-liter elements and of a continuous stirred reactor with a volume of 32.5 liters, assumed to be perfectly stirred. The minimum residence time in the stirred reactors is 20 minutes.

Methylcyclohexane, butadiene, styrene and tetrahydrofurfuryl ethyl ether are continuously introduced according to the following proportions: butadiene flow rate by weight=2.85 kg·h$^{-1}$, styrene flow rate by weight=1.25 kg·h$^{-1}$, concentration by weight of monomer=11 wt. %, 60 ppm of tetrahydrofurfuryl ethyl ether, into a 32.5-liter continuous stirred reactor, assumed to be perfectly stirred according to a person skilled in the art. n-Butyllithium (n-BuLi) is introduced in a sufficient amount in order to neutralize the protic impurities introduced by the different constituents present in the line inlet. 850 µmol of n-BuLi per 100 g of monomers are introduced at the inlet of the reactor.

The different flow rates are calculated in order for the mean residence time in the reactor to be 40 min. The temperature is maintained at 90° C.

The degree of conversion, measured on a sample withdrawn at the reactor outlet, is 92.6%.

At the outlet of the polymerization reactor, (3-N,N-dimethylaminopropyl)trimethoxysilane in solution in methylcyclohexane is added to the living polymer solution in different amounts (different (3-N,N-dimethylaminopropyl)trimethoxysilane/PLi molar ratios) in order to characterize the functionalization process. This solution is mixed in a static mixer composed of 36 mixing elements of Kenics KMR type and then passes through an empty pipe, the total residence time in the pipe being 3 minutes (static mixer+empty pipe), and a 32.5-liter continuous stirred reactor, assumed to be perfectly stirred according to a person skilled in the art, with a residence time of 40 minutes. The polymers are subsequently subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymers thus treated are separated from their solution by a steam stripping operation and then dried on an open mill at 100° C.

Figure 3:
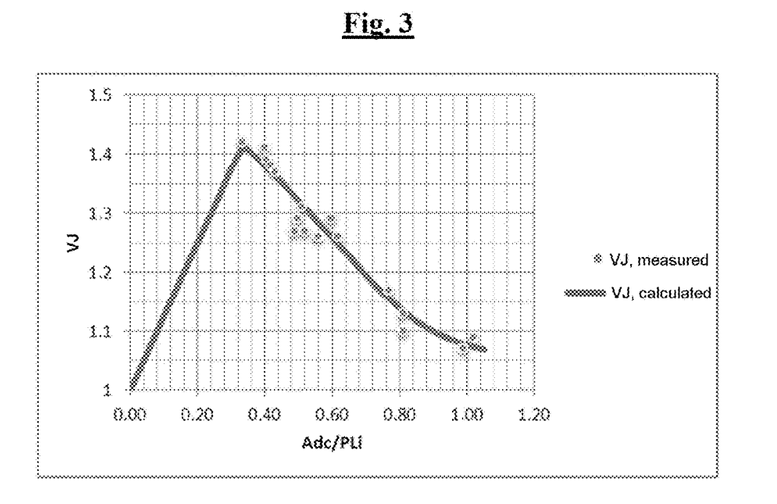
FIG. 3 is a graph illustrating jumps in intrinsic viscosity (VJ) measured according to Example 3.

The jumps in intrinsic viscosity (VJ) measured are presented in FIG. 3.

The kinetic model of functionalization described above is incorporated, according to a person skilled in the art, in a model of tubular reactor (representative of the Kenics static mixer), followed by a perfectly stirred continuous reactor (representative of the stirred functionalization reactor) (bibliography: Villermeaux, J; Génie de la reaction chimique; 1993) and makes it possible to determine the distribution of PLi, P, PA, $P_2A$ and $P_3A$ entities.

In order to make the connection between the distribution of the entities PLi, P. PA, $P_2A$ and $P_3A$ which is calculated by the kinetic model of functionalization and the experimental ratio of intrinsic viscosities before and after functionalization (VJ), the VJ is calculated theoretically by the equation below:

$$VJ = \left( \frac{\sum_{i=1}^{n} w_{P_iA} \overline{M}_{w,P_i A}^{a} g_i'}{\overline{M}_{w,P}^{a}} \right)$$

where:
$wP_iA$ is the fraction by weight of the entities PA, PLi and P;
Mw is the weight-average molecular weight;
a is the parameter of the MHS (Mark-Houwink-Sakurada) equation and is equal to 0.75;
$g_i'$ is a correction for the star-branched polymers, for example:

$$g_i' = \left( \frac{3i - 2}{i^2} \right)^b$$

where:
b is equal to 0.58 (work: Structure and Rheology of Molten Polymers).

By assuming that the residence time is long enough to be regarded as infinite, the ratio of kinetic constants K is estimated by minimizing the differences in experimental and calculated VJ. The value of K is $10^{1\pm1}$, as represented in FIG. 3.

Figure 4:
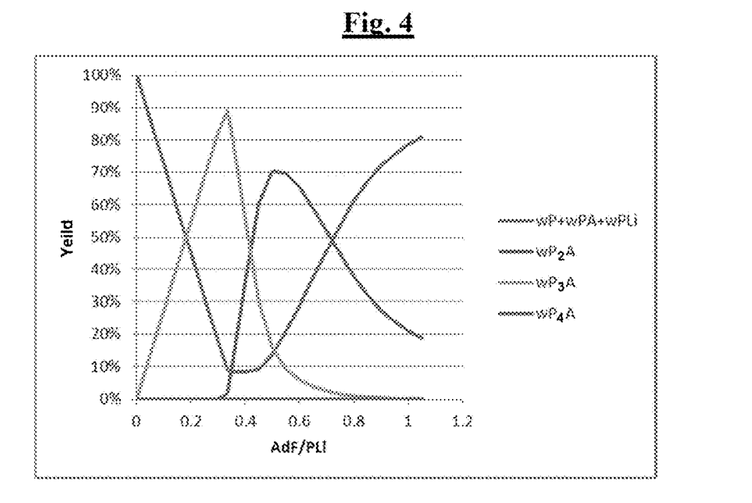
FIG. 4 is a graph illustrating calculated VJ determined from a distribution of entities calculated by a kinetic model incorporated in models of tubular and perfectly stirred continuous reactors according to Example 3.

The calculated VJ is determined from the distribution of entities which is calculated by the kinetic model incorporated in the models of tubular and perfectly stirred continuous reactors (FIG. 4).

II—Tests
I-1. Preparation of the Elastomers
Preparation of Polymer 1: Polymer Functionalized by (3-N,N-dimethylaminopropyl)trimethoxysilane in the Middle of the Chain According to an Embodiment of the Invention Methylcyclohexane, butadiene, styrene and tetrahydrofurfuryl ethyl ether are continuously introduced according to the following proportions: butadiene flow rate by weight=2.85 kg·h$^{-1}$, styrene flow rate by weight=1.25 kg·h$^{-1}$, concentration by weight of monomer=11 wt. %, 60 ppm of tetrahydrofurfuryl ethyl ether, into a 32.5-liter continuous stirred reactor, assumed to be perfectly stirred according to a person skilled in the art. n-Butyllithium (n-BuLi) is introduced in the line inlet in a sufficient amount in order to neutralize the protic impurities introduced by the different constituents present in the line inlet. 850 µmol of n-BuLi per 100 g of monomers are introduced at the inlet of the reactor.

The different flow rates are calculated in order for the mean residence time in the reactor to be 40 min. The temperature is maintained at 90° C.

The degree of conversion, measured on a sample withdrawn at the reactor outlet, is 92.6% and the intrinsic viscosity is 1.68 dl·g$^{-1}$ At the reactor outlet, 386 micromol of (3-N,N-dimethylaminopropyl)trimethoxysilane in solution in methylcyclohexane per 100 g of monomers are added to the living polymer solution. This solution is mixed in a static mixer composed of 36 mixing elements of Kenics KMR type and then passes through an empty pipe, the total residence time in the pipe being 3 minutes (static mixer+empty pipe), and in a 32.5-liter continuous stirred reactor, assumed to be perfectly stirred according to a person skilled in the art, with a residence time of 40 minutes. The polymer is subsequently subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is separated from its solution by a steam stripping operation and then dried on an open mill at 100° C., in order to obtain the polymer 1 functionalized by (3-N,N-dimethylaminopropyl)trimethoxysilane in the middle of the chain according to an embodiment of the invention.

The intrinsic viscosity of this polymer 1 is 2.15 dl·g$^{-1}$, the jump in viscosity is 1.28 and the viscosity $ML_{(1+4)}100°$ C. is 72.0. The number-average molar mass Mn of the polymer, determined by the conventional SEC technique, is 145 000 g·mol$^{-1}$ and the polydispersity index PI is 1.72. The cold flow $CF_{(1+6)}100°$) C of this elastomer is 0.452.

The microstructure of this polymer is determined by the NIR method: the content by weight of 1,2-units is 24.1%, this content being with reference to the butadiene units. The content by weight of styrene is 26.5%.

Preparation of Polymer 2: Polymer Functionalized by (3-N,N-dimethylaminopropyl)trimethoxysilane in the Middle of the Chain According to an Embodiment of the Invention Methylcyclohexane, butadiene, styrene and tetrahydrofurfuryl ethyl ether are continuously introduced according to the following proportions: butadiene flow rate by weight=2.85 kg·h$^{-1}$, styrene flow rate by weight=1.25 kg·h$^{-1}$, concentration by weight of monomer=11 wt. %, 60 ppm of tetrahydrofurfuryl ethyl ether, into a 32.5-liter continuous stirred reactor, assumed to be perfectly stirred according to a person skilled in the art. n-Butyllithium (n-BuLi) is introduced in the line inlet in a sufficient amount in order to neutralize the protic impurities introduced by the different constituents present in the line inlet. 845 µmol of n-BuLi per 100 g of monomers are introduced at the inlet of the reactor.

The different flow rates are calculated in order for the mean residence time in the reactor to be 40 min. The temperature is maintained at 90° C.

The degree of conversion, measured on a sample withdrawn at the reactor outlet, is 92.7% and the intrinsic viscosity is 1.66 dl·g$^{-1}$.

At the reactor outlet, 396 micromol of (3-N,N-dimethylaminopropyl)trimethoxysilane in solution in methylcyclohexane per 100 g of monomers are added to the living polymer solution. This solution is mixed in a static mixer composed of 36 mixing elements of Kenics KMR type and then passes through an empty pipe, the total residence time in the pipe being 3 minutes (static mixer+empty pipe). The polymer is subsequently subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is separated from its solution by a steam stripping operation and then dried on an open mill at 100° C., in order to obtain the polymer 2 functionalized by (3-N,N-dimethylaminopropyl)trimethoxysilane in the middle of the chain according to an embodiment of the invention.

The intrinsic viscosity of this polymer 2 is 2.12 dl·g$^{-1}$, the jump in viscosity is 1.28 and the viscosity $ML_{(1+4)}100°$ C. is 70.4. The number-average molar mass Mn of the polymer, determined by the conventional SEC technique, is 142 000 g·mol$^{-1}$, the molar mass and the polydispersity index PI is 1.73. The cold flow $CF_{(1+6)}100°$ C of this elastomer is 0.614.

The microstructure of this polymer is determined by the NIR method: the content by weight of 1,2-units is 23.6%, this content being with reference to the butadiene units. The content by weight of styrene is 26.6%.

Preparation of Polymer 3: Polymer Functionalized by (3-N,N-dimethylaminopropyl)trimethoxysilane in the Middle of the Chain Methylcyclohexane, butadiene, styrene and tetrahydrofurfuryl ethyl ether are continuously introduced according to the following proportions: butadiene flow rate by weight=2.85 kg·h$^{-1}$, styrene flow rate by weight=1.25 kg·h$^{-1}$, concentration by weight of monomer=11 wt. %, 60 ppm of tetrahydrofurfuryl ethyl ether, into a 32.5-liter continuous stirred reactor, assumed to be perfectly stirred according to a person skilled in the art. n-Butyllithium (n-BuLi) is introduced in the line inlet in a sufficient amount in order to neutralize the protic impurities introduced by the different constituents present in the line inlet. 840 µmol of n-BuLi per 100 g of monomers are introduced at the inlet of the reactor.

The different flow rates are calculated in order for the mean residence time in the reactor to be 40 min. The temperature is maintained at 90° C.

The degree of conversion, measured on a sample withdrawn at the reactor outlet, is 93.5% and the intrinsic viscosity is 1.66 dl·g$^{1}$.

This living polymer solution is continuously introduced into a second 32.5-liter continuous stirred reactor, assumed to be perfectly stirred according to a person skilled in the art, with a residence time of 40 minutes, into which 393 micromol of (3-N,N-dimethylaminopropyl)trimethoxysilane in solution in methylcyclohexane per 100 g of monomers are continuously introduced. The polymer is subsequently subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is separated from its solution by a steam stripping operation and then dried on an open mill at 100° C., in order to obtain the polymer 3 functionalized by (3-N,N-dimethylaminopropyl)trimethoxysilane in the middle of the chain.

The intrinsic viscosity of this polymer 3 is 2.14 dl·g$^{-1}$, the jump in viscosity is 1.29 and the viscosity $ML_{(1+4)}100°$) C is 76.4. The number-average molar mass Mn of the polymer, determined by the conventional SEC technique, is 144 000 g·mol$^{-1}$ and the polydispersity index PI is 1.80. The cold flow $CF_{(1+6)}100°$) C of this elastomer is 0.216.

The microstructure of this polymer is determined by the NIR method: the content by weight of 1,2-units is 24.4%, this content being with reference to the butadiene units. The content by weight of styrene is 27.0%.

The characteristics of the different elastomers are given in Table 3:

TABLE 3

|  | Examples | | Comparative example |
|---|---|---|---|
|  | 1 | 2 | 3 |
| $ML_{(1+4)}$ 100° C. | 72.0 | 70.4 | 76.4 |
| $CF_{(1+6)}$ 100° C. | 0.452 | 0.614 | 0.216 |
| Viscosity jump (dl · g$^{-1}$) | 1.28 | 1.28 | 1.29 |
| Non-functional chains (%)* | 8.0 | 8.0 | 8.0 |
| Non-functionalized living chains (%)* | 0.0 | 5.4 | 0.0 |
| Chains functionalized at the chain end (%)* | 5.4 | 9.0 | 8.9 |
| Chains functionalized in the middle of the chain (%)* | 70.5 | 66.8 | 51.3 |
| Star-branched chains (%)* | 16.1 | 10.8 | 31.8 |

*Theoretical estimation of the chain distributions (assuming the reaction mechanism (above), the kinetic model (above) and K = 10).

II-2. Preparation of the Compositions

The procedure for the tests which follow is as follows: the modified diene elastomers synthesized above are introduced into an 85 cm$^3$ Polylab internal mixer, filled to 70%, the initial vessel temperature of which is approximately 110° C. The reinforcing fillers, the coupling agent and then, after kneading for one to two minutes, the various other ingredients, with the exception of the vulcanization system, are subsequently introduced into the mixer. Thermomechanical working is then carried out (non-productive phase) in one stage (total duration of the kneading equal to approximately 5 min), until a maximum "dropping" temperature of 160° C. is reached. The mixture thus obtained is recovered and cooled and then the vulcanization system (sulphur) is added on an external mixer (homofinisher) at 25° C., everything being mixed (productive phase) for approximately 5 to 6 min. The compositions thus obtained are subsequently calendered, either in the form of plaques (thickness of 2 to 3 mm) or of thin sheets of rubber for the measurement of their physical or mechanical properties.

The rubber compositions are given in Table 4. The amounts are expressed in parts per 100 parts by weight of elastomer (phr).

TABLE 4

|  | Examples | | Comparative example |
|---|---|---|---|
| Composition | 1 | 2 | 3 |
| Polymer 1 | 100 | | |
| Polymer 2 | | 100 | |
| Polymer 3 | | | 100 |
| Silica (1) | 80 | 80 | 80 |

TABLE 4-continued

|  | Examples | | Comparative example |
| --- | --- | --- | --- |
| Composition | 1 | 2 | 3 |
| N234 | 1 | 1 | 1 |
| MES Oil (2) | 15 | 15 | 15 |
| Resin (3) | 15 | 15 | 15 |
| Coupling agent (4) | 6.4 | 6.4 | 6.4 |
| ZnO | 2.5 | 2.5 | 2.5 |
| Stearic acid | 2 | 2 | 2 |
| Antioxidant (5) | 1.9 | 1.9 | 1.9 |
| Antiozone wax C32ST (6) | 1.5 | 1.5 | 1.5 |
| Diphenylguanidine | 1.5 | 1.5 | 1.5 |
| Sulphur | 1.2 | 1.2 | 1.2 |
| Sulphenamide (7) | 2 | 2 | 2 |

(1) Silica Zeosil 1165MP from Rhodia.
(2) Catenex ® SBR from Shell.
(3) Resin Dercolyte L120 from DRT.
(4) "Si69" from Degussa.
(5) N-(1,3-Dimethylbutyl)-N'-phenyl-p-phenylenediamine.
(6) Antiozone from Repsol.
(7) N-Cyclohexyl-2-benzothiazolesulphenamide.

The results of measurements of the dynamic properties are expressed in the following Table 5:

TABLE 5

|  | Examples | | Comparative example |
| --- | --- | --- | --- |
| Compositions | 1 | 2 | 3 |
| tan δ max 23° C. | 0.197 | 0.203 | 0.217 |

It is observed that elastomers 1 and 2 exhibit cold flow values regarded as sufficiently low to limit the flow problems, while minimizing, in the reinforced rubber composition, the tan δ value, expressing a reduced hysteresis. Conversely, elastomer 3 exhibits a cold flow value which is further reduced but to the detriment of the hysteresis of the reinforced rubber composition in which it is present. The compromise between the cold flow of the elastomers and the hysteresis of the rubber composition in which they are present is optimized and entirely satisfactory for elastomers 1 and 2 according to an embodiment of the invention.

The invention claimed is:

1. A modified diene elastomer, comprising:
   at least 55% by weight, with respect to the total weight of the modified diene elastomer, of diene elastomer (a) coupled by a functional group bearing a function of formula —SiOR, in which R is a hydrogen atom or an alkyl radical having from 1 to 10 carbon atoms, and bearing another function capable of interacting with a reinforcing filler, the functional group bearing a function of formula —SiOR being bonded to two branches of the diene elastomer (a) via the silicon atom,
   of from 5% by weight to 30% by weight, with respect to the total weight of the modified diene elastomer, of star-branched diene elastomer (b) having three elastomeric branches connected to one and the same silicon atom belonging to a functional group bearing a function capable of interacting with a reinforcing filler,
   of a content of less than or equal to 15% by weight, with respect to the total weight of the modified diene elastomer, of diene elastomer (c) functionalized at the chain end by a functional group bearing a function —Si(OR)$_2$, in which R is a hydrogen atom or an alkyl radical having from 1 to 10 carbon atoms, and bearing another function capable of interacting with a reinforcing filler, the functional group bearing a function —Si(OR)$_2$ being bonded to the diene elastomer via the silicon atom, and
   of a content of less than or equal to 15% by weight, with respect to the total weight of the modified diene elastomer, of non-functional diene elastomer (d).

2. The elastomer according to claim 1, including at least 10% by weight and at most 25% by weight, with respect to the total weight of the modified diene elastomer, of the star-branched diene elastomer (b).

3. The elastomer according to claim 2, including at most 20% by weight, with respect to the total weight of the modified diene elastomer, of the star-branched diene elastomer (b).

4. The elastomer according to claim 1, including greater than 0% by weight and less than 10% by weight, with respect to the total weight of the modified diene elastomer, of the non-functional diene elastomer (d).

5. The elastomer according to claim 1, including a content of greater than or equal to 65% by weight, with respect to the total weight of the modified diene elastomer, of the coupled diene elastomer (a).

6. The elastomer according to claim 1, including a content of less than or equal to 10% by weight, with respect to the total weight of the modified diene elastomer, of the diene elastomer (c).

7. The elastomer according to claim 1, wherein the function of the diene elastomer (a) capable of interacting with a reinforcing filler is a function chosen from primary, secondary or tertiary and cyclic or non-cyclic amines, isocyanates, imines, cyanos, thiols, carboxylates, epoxides or primary, secondary or tertiary phosphines.

8. The elastomer according to claim 1, wherein the function of the diene elastomer (a) capable of interacting with a reinforcing filler is a tertiary amine function.

9. The elastomer according to claim 8, wherein the function of the diene elastomer (a) capable of interacting with a reinforcing filler is a diethylamine or dimethylamine function.

10. The elastomer according to claim 1, wherein the function of the diene elastomer (a) capable of interacting with a reinforcing filler and the silicon atom bonded to the elastomer are connected to one another via a spacer group defined as being a saturated or unsaturated, cyclic or non-cyclic, linear or branched, divalent $C_1$-$C_{18}$ aliphatic hydrocarbon radical or a divalent $C_6$-$C_{18}$ aromatic hydrocarbon radical and can comprise one or more aromatic radicals and/or one or more heteroatoms.

11. The elastomer according to claim 10, wherein the spacer group is a linear divalent $C_1$-$C_6$ aliphatic hydrocarbon radical.

12. The elastomer according to claim 1, wherein, in the formulae —SiOR and —Si(OR)$_2$ representing the alkoxysilane functions of the diene elastomers (a) and (c), R is an alkyl radical having from 1 to 4 carbon atoms.

13. The elastomer according to claim 1, wherein, in the formulae —SiOR and —Si(OR)$_2$ representing the alkoxysilane functions of the diene elastomers (a) and (c), R is a hydrogen atom.

14. The elastomer according to claim 1, wherein the diene elastomer is chosen from polybutadienes, butadiene/styrene copolymers, butadiene/isoprene copolymers, isoprene/styrene copolymers, butadiene/styrene/isoprene terpolymers and synthetic polyisoprene.

15. A reinforced rubber composition based on at least one reinforcing filler and on an elastomer matrix, wherein the elastomer matrix comprises at least one modified diene elastomer as defined in claim 1.

16. The reinforced rubber composition according to claim 15, wherein the reinforcing filler comprises at least 50% by weight of silica, with respect to the total weight of the reinforcing filler.

17. A tire comprising a crosslinkable or crosslinked rubber composition as defined in claim 15.

18. A process for the synthesis of an elastomer as defined in claim 1, comprising the steps of: mixing at least two of the diene elastomers, which are modified by one and the same functionalization agent, and exhibiting a different composition, these diene elastomers of different compositions being obtained by carrying out a modification stage, after an anionic polymerization stage, while varying the molar ratio of the functionalization agent to the polymerization initiator:
from 0.40 to 0.75, in order to favor the formation of the coupled diene elastomer,
from 0.20 to 0.35, in order to favor the formation of the star-branched diene elastomer, and/or
at least equal to 0.75, in order to favor the formation of the diene elastomer functionalized at the chain end,
the functionalization agent corresponding to the following formula 1:

Formula 1 in which:
R is a saturated or unsaturated, cyclic or non-cyclic, divalent $C_1$-$C_{18}$ aliphatic hydrocarbon radical or divalent $C_6$-$C_{18}$ aromatic hydrocarbon radical,
X is a hydrogen atom or a function capable of interacting with a reinforcing filler,
the R' radicals, which are substituted or unsubstituted and identical or different, represent a $C_1$-$C_{10}$ alkyl group.

* * * * *